United States Patent
Que et al.

(10) Patent No.: US 12,380,075 B2
(45) Date of Patent: Aug. 5, 2025

(54) DATA PROCESSING METHOD AND APPARATUS, AND COMPUTING SYSTEM

(71) Applicant: Huawei Technologies Co., Ltd., Shenzhen (CN)

(72) Inventors: Mingjian Que, Hangzhou (CN); Ben Feng, Hangzhou (CN); Zhongbin Xue, Beijing (CN); Yunfei Lu, Shenzhen (CN); Yuanyue Zheng, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/405,483

(22) Filed: Jan. 5, 2024

(65) Prior Publication Data

US 2024/0143566 A1 May 2, 2024

Related U.S. Application Data

(63) Continuation of application No. PCT/CN2022/100432, filed on Jun. 22, 2022.

(30) Foreign Application Priority Data

Jul. 9, 2021 (CN) .......................... 202110778003.8

(51) Int. Cl.
G06F 16/00 (2019.01)
G06F 16/21 (2019.01)
(52) U.S. Cl.
CPC ................................ G06F 16/217 (2019.01)
(58) Field of Classification Search
CPC ............................. G06F 16/951; G06F 16/835
See application file for complete search history.

(56) References Cited

U.S. PATENT DOCUMENTS

| | | | | |
|---|---|---|---|---|
| 6,304,867 | B1 * | 10/2001 | Schmidt | G06F 16/284 |
| 7,809,694 | B2 * | 10/2010 | Nelson | G06F 16/2453 |
| | | | | 707/688 |
| 11,106,540 | B1 * | 8/2021 | Welcker | G06F 16/217 |
| 12,079,185 | B2 * | 9/2024 | Misiewicz | G06F 16/3347 |
| 2018/0217856 | A1 * | 8/2018 | Wu | H04L 41/5025 |
| 2019/0129874 | A1 * | 5/2019 | Huang | G06F 9/5044 |
| 2019/0391980 | A1 * | 12/2019 | Mundar | G06F 9/50 |
| 2020/0394195 | A1 | 12/2020 | Bensberg et al. | |
| 2022/0374723 | A1 * | 11/2022 | Blukis | G06V 10/82 |

(Continued)

FOREIGN PATENT DOCUMENTS

| | | |
|---|---|---|
| CN | 107491529 A | 12/2017 |
| CN | 112486985 A | 3/2021 |
| WO | 2015188315 A1 | 12/2015 |

OTHER PUBLICATIONS openGauss, "openGauss Officially Release Version 2.0.0", Mar. 31, 2021, total 6 pages.

*Primary Examiner* — Noosha Arjomandi
(74) *Attorney, Agent, or Firm* — Slater Matsil, LLP

(57) ABSTRACT

In accordance with an embodiment, a data processing method includes: obtaining a first operation command, where the first operation command is used to perform data processing in a relational database; determining an acceleration policy of the first operation command, wherein the acceleration policy is used to accelerate a processing process of the first operation command; and performing an operation of the first operation command based on the acceleration policy.

21 Claims, 9 Drawing Sheets

(56) References Cited

U.S. PATENT DOCUMENTS

2023/0236977 A1* 7/2023 Dev .................... G06F 12/0891
  711/118
2024/0143566 A1* 5/2024 Que ........................ G06F 16/28

* cited by examiner

| LSN | LSN0 | LSN1 | LSN2 | LSN3 | LSN4 | LSN5 | LSN6 | LSN7 |
|---|---|---|---|---|---|---|---|---|
| LRC | 0 | 1 | 2 | 3 | 4 | 5 | 6 | 7 |
| Status | Write-allowed | Write-allowed | Write-allowed | Write-allowed | Write-allowed | Write-unallowed | Write-allowed | Write-allowed |

Written into a disk →

TO FIG. 7(b)

DATA PROCESSING METHOD AND APPARATUS, AND COMPUTING SYSTEM

CROSS-REFERENCE TO RELATED APPLICATIONS

This application is a continuation of International Application No. PCT/CN2022/100432, filed on Jun. 22, 2022, which claims priority to Chinese Patent Application No. 202110778003.8, filed on Jul. 9, 2021. The disclosures of the aforementioned applications are hereby incorporated by reference in their entireties.

TECHNICAL FIELD

This application relates to the database field, and in particular, to a data processing method and apparatus, and a computing system.

BACKGROUND

A relational database is a database that organizes data based on a relational model and stores data in rows and columns. For example, PostgreSQL, MySQL, and open-Gauss are all relational databases. The relational database features high concurrency, that is, a large quantity of users access related data in the relational database. Generally, to ensure that a result is fed back to a user as quickly as possible under a condition that data is correct, methods such as using a multi-core processor and expanding computing and storage resources are used to improve processing performance of the relational database. However, horizontal expansion of hardware resources cannot fundamentally resolve a problem of processing performance of the relational database. For example, if a processor converts, based on a volcano model, an operation command for a relational database into a plurality of operators, and implements an operation on the relational database by performing a plurality of times of recursive invocation on the plurality of operators, performance of the relational database is reduced, and hardware resource utilization is reduced. Therefore, how to improve performance of the relational database and hardware resource utilization is an urgent problem to be resolved.

SUMMARY

This application provides a data processing method and apparatus, and a computing system, to ensure that performance a relational database and hardware resource utilization are improved.

According to a first aspect, a data processing method is provided. The method may be performed by a computing device, and the method specifically includes: After obtaining a first operation command for a relational database, the computing device determines an acceleration policy of the first operation command, and performs an operation of the first operation command based on the acceleration policy. The acceleration policy indicates a manner of accelerating a processing process of the first operation command.

In this way, after the computing device accelerates the processing process of the first operation command based on the acceleration policy, duration of processing the first operation command by the computing device is reduced, performance of the relational database is improved, and hardware resource utilization is improved.

In a possible implementation, that the computing device determines an acceleration policy of the first operation command includes: The computing device determines a processing mode based on an identifier of the first operation command, where the identifier indicates a processing mode usable by the first operation command, and the processing mode includes using a bypass framework to perform processing of the first operation command.

For example, the computing device selects a bypass framework to process the operation of the first operation command. After determining an operation step set based on the first operation command, the computing device performs a combination operation on operation steps in the operation step set based on a type of the first operation command, to obtain a combined operation step set, and then the computing device completes the first operation command based on the combined operation step set. The operation step set includes operation steps for executing the first operation command.

In this way, compared with implementing an operation on a relational database based on an execution framework by performing a plurality of times of recursive invocation on a plurality of operators, in the processing mode indicated by the acceleration policy provided in this embodiment of this application, the plurality of operators are combined based on a bypass framework to obtain a combined operator, so that a quantity of times of recursive invocation between the operators is reduced by performing the combined operator, and the operation on the relational database is completed as quickly as possible to obtain an operation result. Therefore, performance of the relational database is improved, a process that hardware occupies too many resources to perform recursive invocation between operators is avoided, and hardware resource utilization is improved.

In another possible implementation, that the computing device determines an acceleration policy of the first operation command includes: determining a target partition in a dynamic partition pruning manner in a data table associated with the first operation command.

For example, the computing device determines the target partition from the data table based on an attribute of the target partition indicated by the operation of the first operation command, and performs the operation of the first operation command on the target partition. The target partition includes data of at least one attribute in the data table.

In this way, an executor in the computing device may modify an SQL statement execution plan based on a partition indicated by a partition identifier, so that the executor dynamically accesses a target partition indicated by the partition identifier, to avoid scanning on a useless partition, thereby reducing resource competition, and improving performance of the relational database.

In another possible implementation, the method further includes: The computing device stores operation logs in a first operation log group in a memory in parallel based on a first rule, where the first operation log group includes at least two operation logs, the at least two operation logs include a first operation log, and the first rule is used to determine whether an operation log in the first operation log group meets a condition for storing the operation log in the memory.

Specifically, the computing device obtains a write permission of a redo log buffer by using the first operation log group, writes logs in the first operation log group into the redo log buffer in parallel, and writes, from the redo log buffer into a disk in parallel, at least one log that meets a write-allowed state in the redo log buffer.

For example, a redo walwriter writes a redo log into the redo log buffer. The redo walwriter detects a redo log, that may be written into the disk, in the redo log buffer. Optionally, the redo walwriter detects redo logs, that are continuously written into the disk, in the redo log buffer. The redo walwriter initializes, based on a quantity of logs to be written into the disk, storage space for storing a log file in the disk. The redo walwriter writes the redo logs, that may be continuously written into the disk, in the redo log buffer into the disk.

Optionally, steps that the redo walwriter initializes the storage space for storing a log file in the disk may be performed by a redo walfileinit. Steps of writing the redo logs in the redo log buffer into the disk may be performed by a redo walflusher.

Therefore, the computing device combines a plurality of transaction logs into one group, preempts a write permission of the redo log buffer by using the group, and writes the transaction logs in the group into the redo log buffer in parallel, to reduce a quantity of times of preempting the write permission of the redo log buffer, thereby improving efficiency of transaction log writing. In addition, in the computing device, a process in which the redo walwriter writes the redo logs into the redo log buffer is decoupled from a process in which the redo walwriter writes the redo logs into the disk. The redo walwriter does not need to wait for releasing the write permission of the redo log buffer, and writes a log into the disk based on a log state of the log recorded in an array. Therefore, a restriction on the write permission of the redo log buffer is removed, and overall performance of the relational database is improved.

The first rule includes: a write permission of a redo log buffer that is in the memory and that is used to store a log is obtained, or a state of at least one operation log included in the first operation log group is a write-allowed state.

In another possible implementation, before the operation logs in the first operation log group are stored in the memory in parallel based on the first rule, the method further includes: dividing the first operation log group based on a quantity of to-be-written operation logs.

The relational database is openGauss, and the operation log includes at least one of a redo log and a write-ahead log.

According to a second aspect, a data processing apparatus is provided. The apparatus includes modules configured to perform the data processing method according to the first aspect or any possible design of the first aspect.

According to a third aspect, a computing system is provided. The computing system includes at least one processor and a memory, and the memory is configured to store a group of computer instructions; when the processor is used as an executing device in the first aspect or any possible implementation of the first aspect to execute the group of computer instructions, operation steps of the data processing method according to the first aspect or any possible implementation of the first aspect are performed.

In a possible implementation, the computing system may be a single computing device or a cluster including a plurality of computing devices.

According to a fourth aspect, a computer-readable storage medium is provided, including computer software instructions, where when the computer software instructions are run on a terminal, a computer is enabled to perform operation steps of the method according to the first aspect or any possible implementation of the first aspect.

According to a fifth aspect, a computer program product is provided. When the computer program product is run on a computer, the computer is enabled to perform operation steps of the method according to the first aspect or any possible implementation of the first aspect.

In this application, based on the implementations provided in the foregoing aspects, further combination may be performed to provide more implementations.

DETAILED DESCRIPTION OF ILLUSTRATIVE EMBODIMENTS

A database system includes a database and a database management system (DBMS). The database is a computer software system that stores and manages data according to data structure. It may also be understood that the database is a set in a computer for storing and managing a large amount of data, that is, an electronic file cabinet. The data stored in the database may include travel records, consumption records, browsed web pages, sent messages, images, music, sounds, and the like. The database management system is software used to manage the database, and is used to establish, use, and maintain the database. The database management system manages and controls the database in a unified manner, to ensure security and integrity of the database. A user can access the data in the database through the database management system. A database administrator may maintain the database through the database management system. The database management system supports a plurality of database client programs in creating, modifying, and querying the database. The database is classified into a relational database (such as PostgreSQL, MySQL, and openGauss databases) and a non-relational database (such as a Cassandra database) based on a database type.

Embodiments of this application mainly provide a solution for improving performance of the relational database. The following describes implementations of embodiments of this application in detail with reference to the accompanying drawings.

Figure 1:
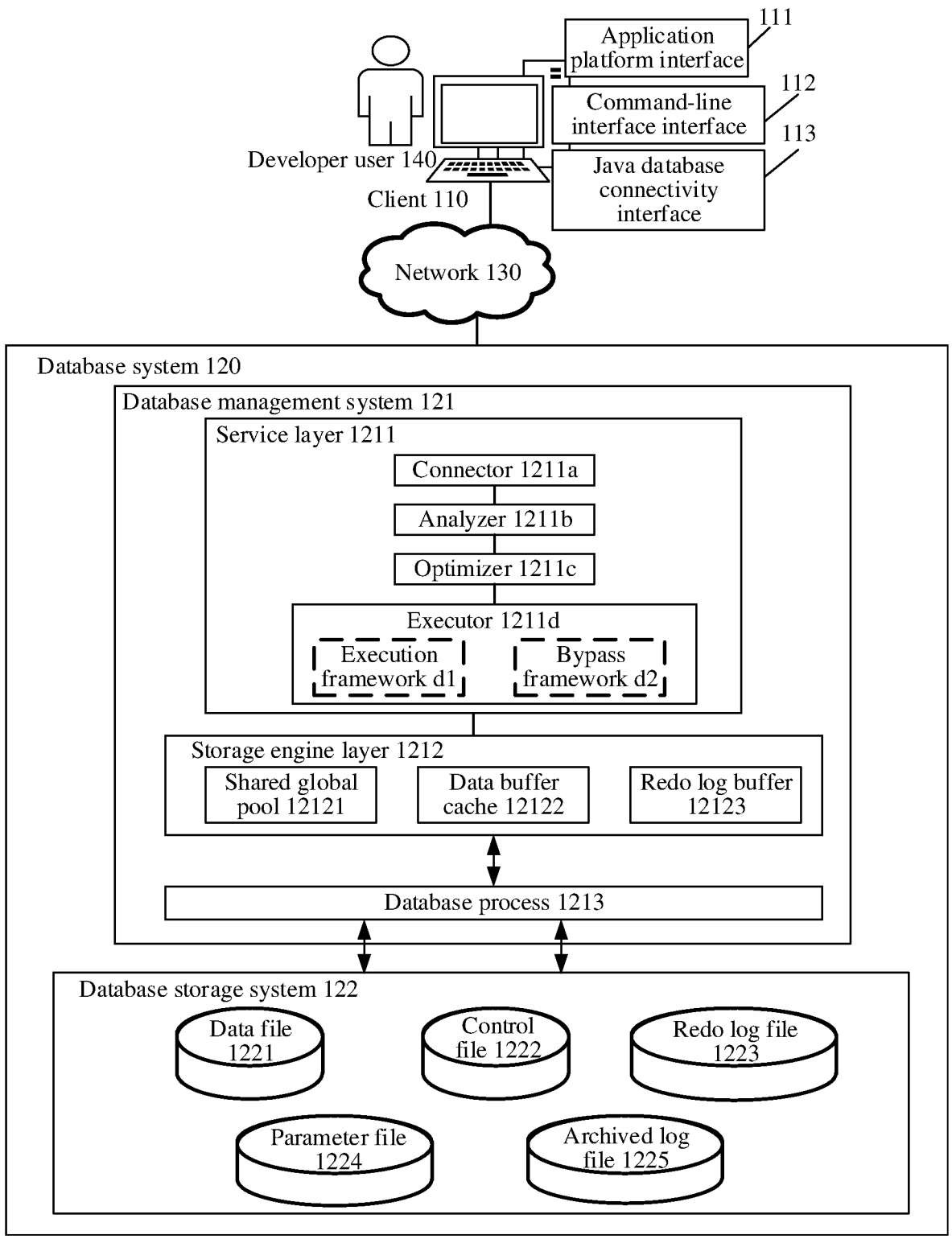
FIG. 1 is a schematic diagram of a database system according to this application.

FIG. 1 is a schematic diagram of a database system according to an embodiment. A client 110 communicates with a database system 120 by using a network 130. The network 130 may refer to the Internet. The client 11o, or referred to as a user terminal, corresponds to a server, and is a program that provides a local service for a customer. The client 110 may also refer to a computer accessing the network 130, or may be referred to as a workstation. A developer user 140 may access the database system 120 by using the client 110 to invoke an application platform interface (API) 11, a command-line interface (CLI) interface 112, or a Java database connectivity (JDBC) interface 113.

The database system 120 includes a database management system 121 and a database storage system 122.

The database management system 121 includes a service layer 1211, a storage engine layer 1212, and a database process 1213. The service layer 1211 is configured to process a structured query language (SQL) accessing the database system 120. The SQL language is a database query and programming language used to access data, and query, update, and manage a relational database. The service layer 1211 may include modules such as a connector 1211a, an analyzer 1211b, an optimizer 1211c, and an executor 1211d to process an SQL statement accessing the database system 120. The connector 1211a is configured to receive an SQL statement sent by the client 11o, and authenticate a user sending the SQL statement, to ensure that an authorized user accesses the database system 120 and ensure security of the database system 120. The analyzer 1211b is configured to perform lexical and syntactic parsing on the SQL statement, to obtain an SQL statement including semantic information. The optimizer 1211c is configured to generate operation steps of the SQL statement based on the SQL statement including the semantic information. The executor 1211d is configured to perform the operation steps of the SQL statement.

In a possible example, an execution framework d1 and a bypass framework d2 are configured in the executor 1211d. The execution framework d1 and the bypass framework d2 may refer to rules for performing the operation steps of the SQL statement. The executor 1211d may select a framework from the execution framework d1 and the bypass framework d2, and perform the operation steps of the SQL statement based on the selected framework, to implement an operation on the database system 120.

In another possible example, a bypass framework d2 is configured in the executor 1211d. The executor 1211d performs the operation steps of the SQL statement based on the bypass framework d2, to implement an operation on the database system 120.

The execution framework may refer to a model for iteratively performing the operation steps, for example, a volcano model. The executor 1211d abstracts each operation of the SQL statement into an operator based on the execution framework, constructs a plurality of operators of the SQL statement into an operator tree, and recursively invokes, from top to bottom, an operator calculation function from a root node to a leaf node of the operator tree to execute the SQL statement. The operators include limit, aggregate, sort, index scan, a partition operation (partIterator), and a modify table.

The bypass framework may include a model for performing the operation steps by combination. The executor 1211d combines the plurality of operators of the SQL statement based on the bypass framework to obtain a combined operator, and executes the combined operator to complete the operation of the SQL statement.

The storage engine layer 1212 may include a shared global pool 12121, a data buffer cache 12122, and a redo log buffer 12123. The redo log buffer may also be referred to as a write-back log buffer.

The shared global pool 12121 is configured to cache at least one of an executed SQL statement, an SQL program, and data dictionary information. For example, the shared global pool 12121 may periodically cache at least one of the executed SQL statement, the SQL program, or the data dictionary information. A cache operation is an area in which syntax analysis, compilation, and execution are performed on the SQL statement or the SQL program. The data buffer cache 12122 is configured to store data read from a data file and data written into the data file. The redo log buffer 12123 is used to cache a redo record generated when a user performs a modification operation on a database, that is, a transaction log, for example, a redo log or a write-ahead log (WAL). In the OpenGauss and PostgreSQL databases, a redo log may also be an X Log.

The database process 1213 includes a system monitoring process, a process monitoring process, a database write process, a log write (LGWR) process, and a checkpoint process. These database processes 1213 together complete a database management task. In addition, all processes in this embodiment may alternatively be described as threads.

The log write process is used to write the transaction log in the redo log buffer into a redo log file in a disk for permanent storage. A condition for starting the log write process includes: The developer user 140 may submit a transaction by using instructions (for example, a commit statement), a remaining storage capacity of the redo log buffer is greater than or equal to a preset threshold, the log write process writes a dirty buffer in the data buffer cache into the data file, and the log write process is started periodically. For example, the log write process is started every 10 seconds.

The database storage system 122 may be files stored on a disk. For example, the files include a data file 1221, a control file 1222, a redo log file 1223, a parameter file 1224, and an archived log file 1225.

The data file 1221 includes data in the database.

The control file 1222 includes binary content that records structure information of the database. When the database starts, the data file and the redo log file are loaded based on the information in the control file, and then the database is opened.

The parameter file 1224 includes content used in a startup process of the database, for example, the parameter file records settings of explicit parameters of the database.

The archived log file 1225 is used to back up and record data of the redo log file 1223, to avoid loss of the recorded data when the redo log file 1223 is rewritten.

The redo log file 1223 includes recording and saving the transaction log in a form of the redo record, that is, a change operation performed by a user on the database, which is a most important physical file in the database. The redo log file may be used to redo or undo a transaction.

Functions or functional modules of the database system 120 in the foregoing embodiments may be implemented by a server or a server cluster. A specific form of the database system 120 is not limited in this application.

To improve performance of a relational database, an embodiment of this application provides a data processing method. After obtaining a first operation command for the relational database, a computing device determines an acceleration policy of the first operation command, and performs an operation of the first operation command based on the acceleration policy. The acceleration policy indicates a manner of accelerating a processing process of the first operation command. For example, the computing device selects a bypass framework to process the operation of the first operation command, or determines a target partition in a dynamic partition pruning manner in a data table associated with the first operation command.

The following describes a detailed data processing process with reference to the accompanying drawings.

Figure 2:
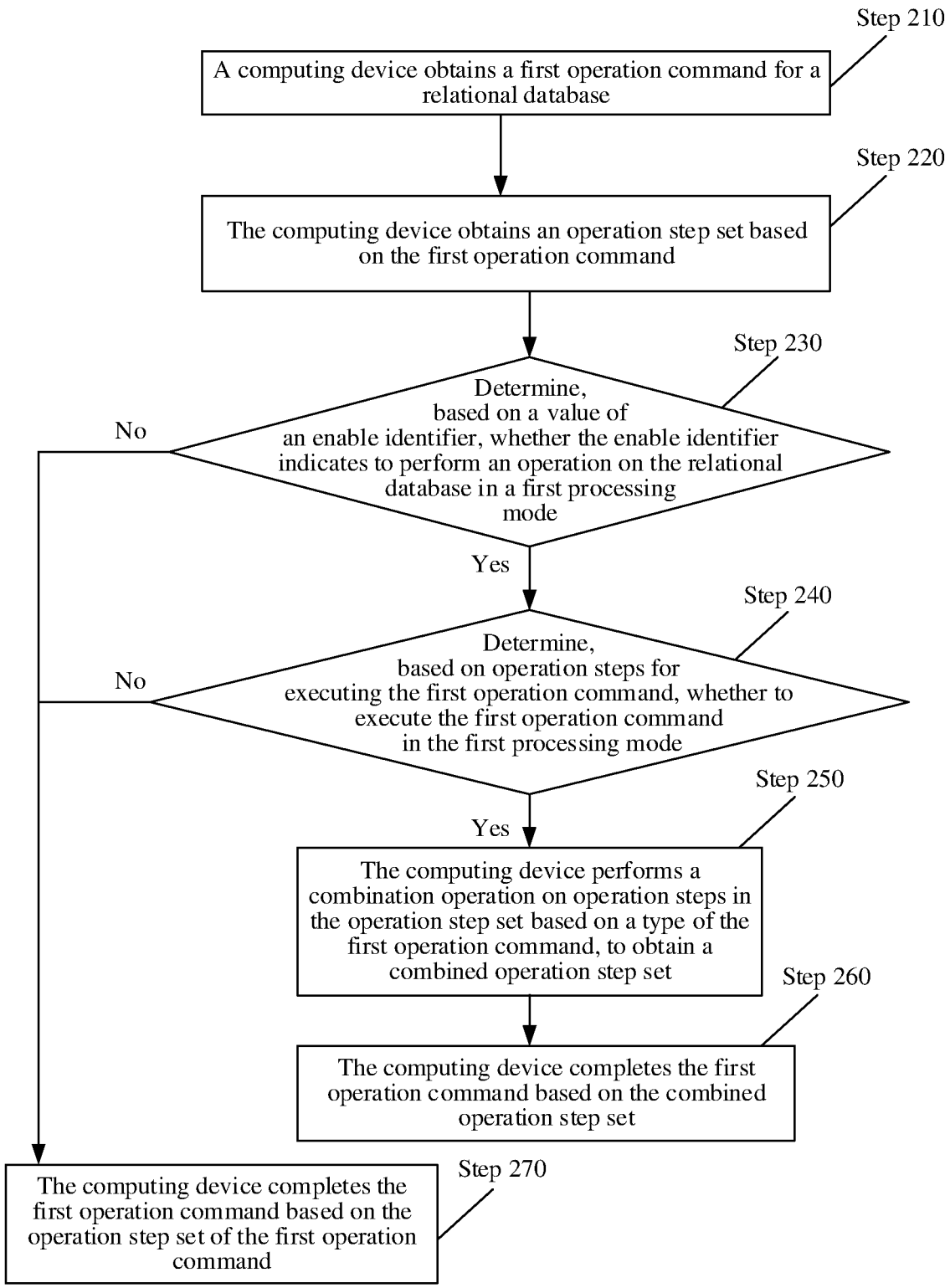
FIG. 2 is a flowchart of a data processing method according to this application.

FIG. 2 is a flowchart of a data processing method according to an embodiment of this application. A computing device may be a server or a device in a server cluster. The method includes the following steps.

Step 210: The computing device obtains a first operation command for a relational database.

The first operation command may be an SQL statement. The computing device may receive the first operation command from a client (for example, the client 11o). For example, the computing device performs functions of the connector 1211a, that is, the computing device receives a message including the first operation command from the client, and the computing device may parse the message to obtain the first operation command and authenticate validity of sending the first operation command, to ensure that an authorized user accesses the relational database (for example, the database system 120). Therefore, security of the relational database is ensured.

Step 220: The computing device obtains an operation step set based on the first operation command.

The operation step set includes operation steps for executing the first operation command. The operation steps for the first operation command may refer to an execution plan for executing the first operation command. The computing device performs functions of the analyzer 1211b and the optimizer 1211c, that is, the computing device performs lexical and syntax parsing on the first operation command to obtain semantic information of the first operation command. The optimizer 1211c is configured to generate the execution plan of the first operation command based on the first operation command including the semantic information, that is, obtain operators of the relational database for executing the first operation.

After obtaining the operation step set, the executor 1211d may determine a processing mode based on an identifier of the first operation command. The identifier indicates a processing mode usable by the first operation command. The processing mode includes using a bypass framework to perform processing of the first operation command.

For ease of description, that the executor 1211d performs operation steps of an SQL statement based on the bypass framework d2 is defined as a first processing mode. The first processing mode indicates to accelerate to perform an operation on the relational database. That the executor 1211d performs operation steps of an SQL statement based on the execution framework d1 is defined as a second processing mode. In other words, in this embodiment provided in this application, the first processing mode or the second processing mode may be selected based on a requirement to perform data processing.

In some embodiments, the computing device may determine, based on the following step 230 and step 240, whether to execute the first operation command in the first processing mode.

Step 230: The computing device determines, based on a value of an enable identifier, whether the enable identifier indicates to perform an operation on the relational database in the first processing mode.

If the enable identifier is 1, it indicates that performing an operation on the relational database in the first processing mode is enabled, that is, the operation steps of the SQL statement are allowed to be performed based on the bypass framework d2; and if the enable identifier is 0, it indicates that performing an operation on the relational database in the first processing mode is disabled and performing an operation on the relational database in the second processing mode is enabled, that is, the operation steps of the SQL statement are not allowed to be performed based on the execution framework d1. A specific value of the enable identifier and a meaning represented by each value may be preconfigured by a system administrator based on a service requirement. The computing device may enable or disable the first processing mode at an entry such as a database configuration file, a user interface, or a database client tool configuration.

If the enable identifier indicates to perform the operation on the relational database in the first processing mode, step 240 is performed; and if the enable identifier indicates to perform the operation on the relational database in the second processing mode, step 270 is performed.

Step 240: The computing device determines, based on the operation steps for executing the first operation command, whether to execute the first operation command in the first processing mode.

The executor 1211d first determines a command type based on the first operation command, where the command type may be select, insert, update, or delete. The executor 1211d obtains a preset operator tree of the command type to which the first operation command belongs, compares an operator tree of the operation steps for the first operation command with the preset operator tree of the command type to which the first operation command belongs, and determines whether to execute the first operation command in the first processing mode.

The executor 1211d may compare all operators at all layers of the operator trees. If all the operators at all layers are the same, or operators that implement main operation functions at all layers are the same, the executor determines to execute the first operation command in the first processing mode.

For example, in a preset operator tree of a select command, a top node includes a limit operator, an aggregate operator, a sort operator, and an index scan operator; an intermediate node includes a partition operation operator, a filter operator, an aggregate operator, and a sort operator; and a leaf node includes an index scan operator.

In a preset operator tree of an insert command, a top node includes a modify table operator.

In a preset operator tree of an update command, a top node includes a modify table operator, an intermediate node includes a partition operation operator, and a leaf node includes an index scan operator.

In a preset operator tree of a delete command, a top node includes a modify table operator, an intermediate node includes a partition operation operator, and a leaf node includes an index scan operator.

Optionally, if the computing device has executed the first operation command on the relational database, the computing device may store the operation steps of the first operation command. After receiving a first operation command for the relational database again, the computing device may obtain historical operation steps of the first operation command from a cache, where the historical operation steps of the first operation command may be the operation steps of the first operation command in the first processing mode or the operation steps of the first operation command in the second processing mode. Therefore, repeated performing of step 230 to step 250 is avoided, and steps in the process of executing the first operation command on the relational database are reduced, thereby improving performance of the relational database and hardware resource utilization. In other words, when receiving an operation command of a same type, the computing device may learn operation steps of an executed command of the same type, that is, the computing device may learn operation steps of a command of the type based on an execution status of a historical command of the same type.

It should be noted that, steps and procedures of the data processing method provided in this embodiment of this application may be adaptively deleted or an execution sequence may be changed based on a requirement. For example, the computing device may not need to perform step 230, and perform step 240 after performing step 220.

If it is determined to execute the first operation command in the first processing mode, the operation steps of the first operation command in the first processing mode are obtained based on the first operation command, that is, step 250 and step 260 are performed; and if it is determined to perform the first operation in the second processing mode, the operation steps of the first operation command in the second processing mode are obtained based on the first operation command, that is, step 270 is performed.

Step 250: The computing device performs a combination operation on operation steps in the operation step set based on a type of the first operation command, to obtain a combined operation step set.

The executor 1211d performs the combination operation on the operation steps in the operation step set based on a combination rule and the type of the first operation command, to obtain the combined operation step set. The combination rule indicates, for example, an operator that performs a combination operation based on an operation command type. The operation command type may include a select command, an insert command, a delete command, an update command, and an update-based select command. The combination rule indicates an operator of the select command, an operator of the insert command, an operator of the delete command, an operator of the update command, and an operator of the update-based select command that may perform a combination operation.

It may be understood that the executor 1211d combines, based on the operator that performs the combination operation and that is indicated by the combination rule, operators of the operation steps in the operation step set, to obtain the combined operation step set. The combined operation step set may include at least one combined operation step. The combined operation step includes at least one operator of the relational database. For example, the combined operation step includes a select combination operation, an insert combination operation, a delete combination operation, an update combination operation, an update-based select combination operation, a scan combination operation, an aggregate combination operation, a sort combination operation, and the like. Because a scan operation is used as an operator for reading data in the relational database, an implementation of the scan combination operation is basically the same as that of the scan operation.

Because different combined operation steps implement operation functions of different relational databases, the different combined operation steps include at least one different operator. However, the different combined operation steps may also include at least one same operator. In this embodiment of this application, operators included in the combined operation step are not strictly distinguished. In actual application, the system administrator may adaptively configure the combined operation step based on a service requirement, so that the executor 1211d properly combines operators of the relational database for an operation on the relational database, thereby improving performance of the relational database and hardware resource utilization.

Because the computing device combines the operation steps in the operation step set based on the combination rule, a quantity of operation steps of the first operation may be reduced, so that a quantity of recursive operations between operators is correspondingly reduced, thereby improving processing efficiency of the first operation.

In some embodiments, the operators of the relational database for executing the first operation command include some operators that are not indicated by the combination rule, and these unindicated operators are not included in the preset operator tree. The executor 1211d may omit these unindicated operators, and combine, based on the combination rule, operators other than the unindicated operators of the relational database for executing the first operation command, to obtain the combined operation step set. In some other embodiments, the executor 1211d does not omit any operator of the relational database for the first operation command, and the executor 1211d combines, based on the combination rule, the operators of the relational database for executing the first operation command, to obtain the operation steps of the first operation command in the first processing mode. It may be understood that, compared with a quantity of operators included in the operation steps of the first operation command in the second processing mode, a quantity of operators included in the operation step of the first operation command in the first processing mode is smaller. In addition, compared with a quantity of times of recursive invocation between the operators in the operation steps of the first operation command in the second processing mode, a quantity of times of recursive invocation between the operators in the operation steps of the first operation command in the first processing mode is smaller.

Figure 3:
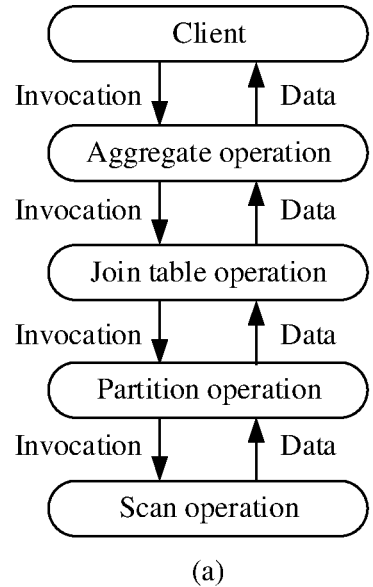
FIG. 3 is a schematic diagram of a stack according to this application.

For example, (a) in FIG. 3 shows an SQL statement execution plan. The SQL statement execution plan includes a client, an aggregate operation, a join table operation, a partition operation, and a scan operation. The aggregate operation is used to combine data of a same type, and perform an operation on the combined data, for example, addition or subtraction. The join table operation is used to associate data in different data tables. The partition operation is used to perform a partition operation on at least one partition in a data table. The scan operation is used to obtain data for an operation command from a relational database.

The aggregate operation, the join table operation, the partition operation, and the scan operation may refer to four operators in the relational database. The client invokes the aggregate operator, the aggregate operator invokes the join table operator, the join table operator invokes the partition operator, and the partition operator invokes the scan operator. The scan operator reads data in a data table. The partition operator selects a corresponding column based on the data read by the scan operator to perform a join table operation. The join table operator performs a join table operation based on a result that meets a join condition and that is returned by the partition operator. The aggregate operator performs an aggregate operation based on a result of the join table operator. The aggregate operator sends data of an aggregation result to the client.

The executor 1211d abstracts the operators based on an execution framework, so that each operator may be independently implemented without considering logic of another operator. However, recursive invocation of the plurality of operators makes an entire stack very deep. (b) in FIG. 3 is a schematic diagram of an execution stack of an SQL statement. An ExecProcNode function indicates an execution entry of each operator. ExecScan\ExecNest Loop\ExecAgg\ExecPartIterator is a specific instantiated operator. Taking a C++ virtual function as an example, instantiation of the ExecProcNode is a polymorphic process of the virtual function. A large quantity of virtual functions are invoked, so that utilization of a processor for a core service is low.

The executor 1211*d* combines, based on a bypass framework, the aggregate operator, the scan operator, the join table operator, and the partition operator to obtain an aggregate combination operator. After the executor 1211*d* invokes the aggregate combination operator, functions of the aggregate operator, the scan operator, the join table operator, and the partition operator are implemented. Branch judgment and recursive invocation of operators in various original complex scenarios are reduced, so that an entire SQL statement execution process is accelerated.

For example, compared with the execution stack shown in (b) in FIG. 3, (c) in FIG. 3 shows an acceleration stack, unlike the execution stack, the executor 1211*d* does not need to perform tree iterative execution on the execution operators when executing the acceleration stack, but accesses a storage engine interface (for example, an index_getnext interface is an interface provided by a storage engine for the outside, and is used to access corresponding data by using an index) to process data, thereby effectively reducing overheads of a processor and an output/input interface. For example, (b) in FIG. 3 includes four entries, and (c) in FIG. 3 includes three entries.

Step 260: The computing device completes the first operation command based on the combined operation step set.

The executor 1211*d* performs a plurality of combined operations included in the operation steps of the first operation command in the first processing mode, and completes the first operation on the relational database by using fewer times of recursive invocation. In this way, performance of the relational database and hardware resource utilization are improved.

Step 270: The computing device completes the first operation command based on the operation step set of the first operation command.

The executor 1211*d* performs the operation steps of the first operation command in the second processing mode to complete the first operation on the relational database.

In this way, compared with implementing an operation on a relational database based on an execution framework by performing a plurality of times of recursive invocation on a plurality of operators, in the processing mode indicated by the acceleration policy provided in this embodiment of this application, the plurality of operators are combined based on a bypass framework to obtain a combined operator, so that a quantity of times of recursive invocation between the operators is reduced by performing the combined operator, and the operation on the relational database is completed as quickly as possible to obtain an operation result. Therefore, performance of the relational database is improved, a process that hardware occupies too many resources to perform recursive invocation between operators is avoided, and hardware resource utilization is improved.

In a possible embodiment, in the data processing method described in FIG. 2, a data processing process may be further accelerated based on a partitioning function.

Figure 4:
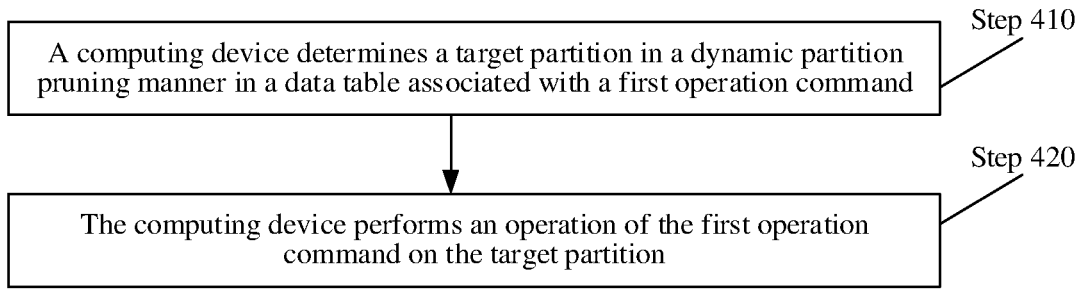
FIG. 4 is a flowchart of a partition operation method according to this application.

A data table includes a plurality of partitions obtained by dividing the data table, and each partition may be a small data table. The partition operation (or referred to as a partIterator operator) may access, based on a partition identifier (or referred to as a partition attribute, a partition key, or a partition key parameter) provided by the SQL statement execution plan, a partition indicated by the partition identifier. The partition operation includes selecting, inserting, deleting, and updating the data table. As shown in FIG. 4, an embodiment of this application provides a partition operation method, including the following steps.

Step 410: A computing device determines a target partition in a dynamic partition pruning manner in a data table associated with a first operation command.

After obtaining a partition identifier, the executor 1211*d* may determine, from the data table based on the partition identifier, the target partition indicated by the partition identifier. The partition identifier may be an attribute in the data table. The attribute may vary for a different data table. For example, for a financial statement, the attribute may include income and expenditure. For another example, for a score statistics table, the attribute may include a class, a name, a gender, a score, and the like.

Step 420: The computing device performs an operation of the first operation command on the target partition.

The executor 1211*d* performs the operation of the first operation command on the target partition based on the target partition indicated by the partition identifier. For example, the executor 1211*d* performs selection, insertion, deletion, and update on data in the target partition.

For example, it is assumed that the data table includes four partitions, the first operation command indicates a partition identifier 1 and a partition identifier 2, and the first operation command indicates to perform a delete operation on a partition 1 indicated by the partition identifier 1, and indicates to perform an update operation on a partition 2 indicated by the partition identifier 2.

The executor 1211*d* determines the partition 1 indicated by the partition identifier 1, and determines the partition 2 indicated by the partition identifier 2. The executor 1211*d* performs a delete operation on the partition 1, and performs an update operation on the partition 2.

It should be noted that a function of dynamically accessing a partition by the executor 1211*d* provided in this embodiment of this application is not limited to the processing modes described in the foregoing embodiment. The executor 1211*d* may dynamically access a partition in the first processing mode or the second processing mode.

This embodiment of this application provides a partition operation method. The executor 1211*d* may modify an SQL statement execution plan based on a partition indicated by a partition identifier, so that the executor 1211*d* dynamically accesses a target partition indicated by the partition identifier, to avoid scanning on a useless partition, thereby reducing resource competition, and improving performance of the relational database.

After performing an operation on the relational database, the computing device generates a transaction log (or referred to as a redo log). The transaction log is used to describe specific change information of data. A way to store the transaction log also affects a data processing process.

Figure 5:
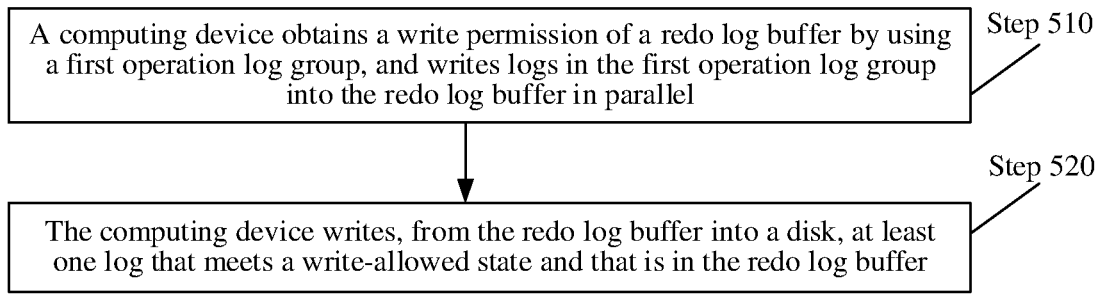
FIG. 5 is a flowchart of a log writing method according to this application.

In another possible embodiment, after a service thread in the computing device executes the first operation command on the relational database, the service thread that generates the first operation log may be further added to a log group, and operation logs generated by all service threads in the log group are written in a memory in parallel in a form of the log group. For example, the computing device may store operation logs in a first operation log group in a memory in parallel based on a first rule. The first operation log group includes at least two operation logs. The at least two operation logs include the first operation log. The first rule is used to determine whether an operation log in the first operation log group meets a condition for storing the operation log in the memory. The first rule may include: a write permission of a redo log buffer that is in the memory and that is used to store a log is obtained, or at least one operation log included in the first operation log group has been written into a main memory. As shown in FIG. 5, a process of writing a transaction log is described in this embodiment of this application.

Step 510: A computing device obtains a write permission of a redo log buffer by using a first operation log group, and writes logs in the first operation log group into the redo log buffer in parallel.

A processor in the computing device may include a plurality of processor cores, and different processor cores may be configured to process different operations on a relational database. Specifically, one or more processes or threads may be run on each processor core, and a specific process or thread executes operation instructions. In this case, different processor cores may generate different operation logs. The processor core may also indicate a service thread that generates an operation log. For example, after executing a first operation command on the relational database, a first service thread in the computing device generates a first operation log.

After generating the first operation log, the first service thread joins the first operation log group. Members included in the first operation log group are service threads, and a quantity of members included in the first operation log group may be preconfigured or may be determined based on a quantity of service threads that generate the operation logs. Alternatively, service threads included in the first operation log group are preconfigured. For example, the first operation log group includes a specified service thread in the computing device. In other words, a quantity of operation log groups and service threads included in each operation log group may be preconfigured. For example, the quantity of operation log groups and a quantity of service processes included in each operation log group may be divided based on a capability of the computing device to perform a log persistence operation in parallel. The service processes included in each operation log group may be divided based on an identifier of a processor core, or may be divided based on a processing capability of a processor core, or may be divided based on a priority of each service thread.

It may be understood that, after all service threads in the first operation log group generate an operation log, one service thread in the first operation log group may be used as a leader thread to preempt the write permission of the redo log buffer. The write permission indicates a permission of being allowed to perform a write operation on the redo log buffer. The redo log buffer may be the redo log buffer 12123 in the storage engine layer 1212 shown in FIG. 1. The redo log buffer may be a storage space in a memory (for example, a main memory) in the computing device that performs step 210 to step 270, or may be a storage space in another memory connected to the computing device. The storage space of the redo log buffer may be 1 G.

Optionally, the leader thread may alternatively be determined based on an identifier of the service thread, resource usage of the service thread, running duration, a spare resource of hardware in which the process is located, or the like.

Figure 6:
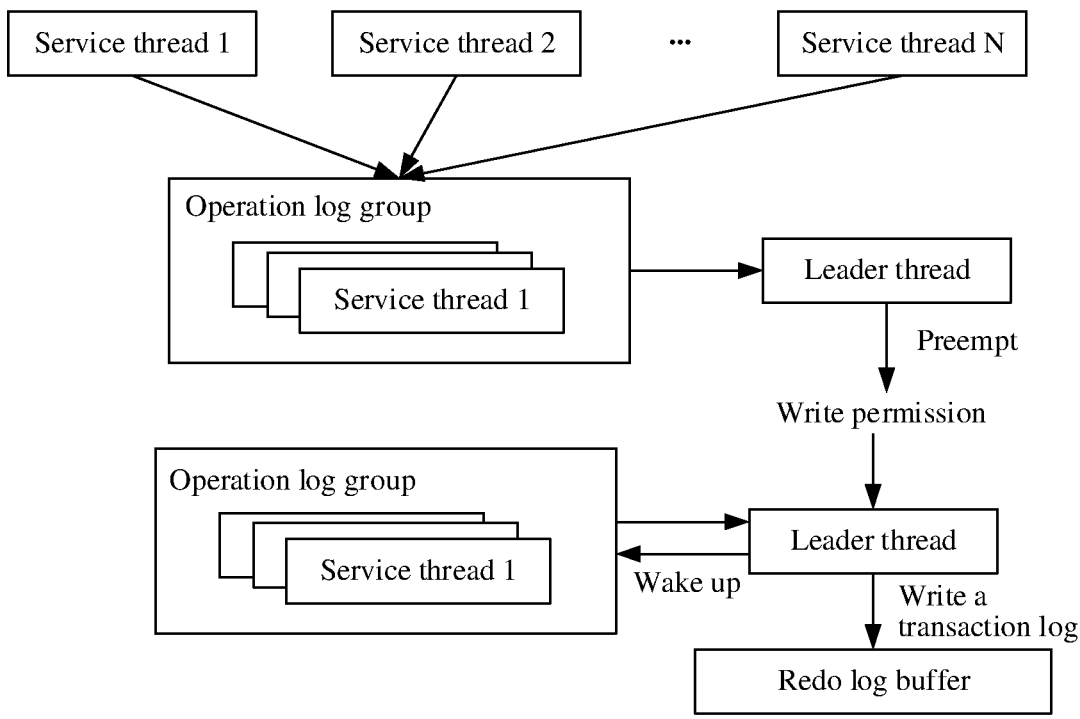
FIG. 6 is a schematic diagram of a log writing process according to this application.

For example, as shown in FIG. 6, N service threads form an operation log group, a service thread that first joins the operation log group is used as a leader thread, and a service thread that subsequently joins the operation log group is a follower thread.

On behalf of the group, the leader thread preempts a write permission of a redo log buffer. Another follower thread in the group falls asleep and waits to be woken up by the leader thread.

It should be noted that the service thread attempts to obtain the write permission of the redo log buffer in an exclusive manner. A quantity of write permissions of the redo log buffer determines concurrency of transaction log writing. For example, if the quantity of write permissions of the redo log buffer is 48, it indicates that 48 service threads may write transaction logs into the redo log buffer at a same moment. Therefore, on behalf of the group, the leader thread preempts one write permission from a preset quantity of write permissions of the redo log buffer.

After the leader thread obtains the write permission of the redo log buffer through preempting, the leader thread traverses a size of a transaction log to be written by each service thread in the group, to obtain a size of storage space for all service threads in the group to be written into the redo log buffer. After the leader thread applies to a controller that controls a main memory for the size of the storage space for the redo log buffer, all the service threads in the group write the transaction logs into the redo log buffer in parallel. Each service thread writes a plurality of generated transaction logs into the redo log buffer in serial.

The leader thread releases the write permission of the redo log buffer and wakes up all asleep service threads in the group.

Because the leader thread writes the transaction logs of all the service threads in the group into the redo log buffer, another follower thread in the group does not need to preempt the write permission of the redo log buffer, and other subsequent processes are performed after the another follower thread in the group wakes up.

Therefore, the computing device combines a plurality of transaction logs into one group, preempts a write permission of the redo log buffer by using the group, and writes the transaction logs in the group into the redo log buffer in parallel, to reduce a quantity of times of preempting the write permission of the redo log buffer, thereby improving efficiency of transaction log writing.

After writing the transaction logs into the redo log buffer, the computing device writes the logs in the redo log buffer into a persistent medium (for example, a disk). Step 520 is performed.

Step 520: The computing device writes, from the redo log buffer into a disk, at least one log that meets a write-allowed state and that is in the redo log buffer.

The redo walwriter detects a redo log, that may be written into the disk, in the redo log buffer. In some embodiments, the computing device sets an array for the redo log in the redo log buffer, and records a status of each transaction log in the redo log buffer. An array depth may be set based on a service requirement. For example, the array depth may also be 100. The array includes a log sequence number (LSN), a log record count (LRC), and a status. The log sequence number is used to ensure that an interval for writing a transaction log into the redo log buffer is globally unique. The log sequence number indicates a length of the transaction log. The log record count is used to ensure uniqueness of a number of the transaction log. The status includes a write-allowed state or a write-unallowed state. The write-allowed state indicates that a log is allowed to be written from the redo log buffer into the disk. The write-unallowed state indicates that a log is not allowed to be written from the redo log buffer into the disk.

If the service thread completes writing the transaction log into the redo log buffer, the write permission of the redo log buffer is released, and the status of the log is the write-allowed state. If the service thread does not complete writing the transaction log into the redo log buffer, the status of the log is the write-unallowed state.

After the service thread completes writing the transaction log into the redo log buffer, the redo walwriter writes, from the redo log buffer, at least one redo log that meets the write-allowed state and that is in the redo log buffer into the disk. If at least two redo logs that meet the write-allowed state exists in the redo log buffer, the redo walwriter writes the at least two redo logs into the disk in serial.

After writing, from the redo log buffer, the at least one redo log that meets the write-allowed state and that is in the redo log buffer into the disk, the redo walwriter refreshes the log that is in the write-allowed state and in the redo log buffer to the write-unallowed state.

Figure 7A:
FIG. 7(*a*) to FIG. 7(*c*) are schematic diagrams of a log writing process according to this application.

For example, FIG. 7(a) is a schematic diagram of an array according to an embodiment of this application. An array depth is 8, that is, statuses of eight redo logs may be recorded. When statuses of redo logs indicated by an LSN0 to an LSN4 are a write-allowed state, it indicates that the redo logs indicated by the LSN0 to the LSN4 are complete logs that have been written by the service thread into a redo log buffer, and a redo walwriter writes the redo logs of the LSN0 to the LSN4 from the redo log buffer into a disk. Because a status of a redo log indicated by an LSN5 is a write-unallowed state, it indicates that the redo log indicated by the LSN5 is a log that has not been completely written by the service thread into the redo log buffer, and the redo walwriter does not write the redo log of the LSN0 to the LSN4 from the redo log buffer into the disk.

Figure 7B:

As shown in FIG. 7(b), after writing of the logs of the LSN0 to the LSN4 is completed, the statuses of the LSN0 to the LSN4 are updated to the write-unallowed state. The redo walwriter traverses each item in the array, and determines that statuses of redo logs indicated by an LSN6 and an LSN7 is a write-allowed state, which indicates that the redo logs indicated by the LSN6 and the LSN7 are complete logs that have been written by the service thread into the redo log buffer. The redo walwriter writes the redo logs of the LSN6 and the LSN7 from the redo log buffer into the disk.

Figure 7C:

As shown in FIG. 7(c), if the service thread completes writing a redo log of an LSN8 into the redo log buffer, a status of the LSN8 is updated to the write-allowed state. LRC0 is updated to LRC8. If the service thread completes writing a log of an LSN9 into the redo log buffer, a status of the LSN9 is updated to the write-allowed state. LRC1 is updated to LRC9.

It should be noted that, before writing a redo log from the redo log buffer into the disk, the redo walwriter further needs to initialize, based on a quantity of logs to be written into the disk, storage space for storing a log file in the disk.

Optionally, steps that the redo walwriter initializes the storage space for storing a log file in the disk may be performed by a redo walfileinit. Steps of writing the redo logs in the redo log buffer into the disk may be performed by a redo walflusher.

In this way, a process in which the redo walwriter writes the redo logs into the redo log buffer is decoupled from a process in which the redo walwriter writes the redo logs into the disk. The redo walwriter does not need to wait for releasing the write permission of the redo log buffer, and writes a log into the disk based on a log state of the log recorded in an array. Therefore, a restriction on the write permission of the redo log buffer is removed, and overall performance of the relational database is improved.

It may be understood that, to implement the functions in the foregoing embodiments, the computing device includes a corresponding hardware structure and/or software module for performing each function. A person skilled in the art should be easily aware that, in combination with the units and the method steps in the examples described in the embodiments disclosed in this application, this application can be implemented by using hardware or a combination of hardware and computer software. Whether a function is performed by using hardware or hardware driven by computer software depends on particular application scenarios and design constraints of the technical solutions.

The foregoing describes in detail the data processing method according to embodiments with reference to FIG. 1 to FIG. 7(c). A data processing apparatus according to an embodiment is described below with reference to FIG. 8 and FIG. 9.

Figure 8:
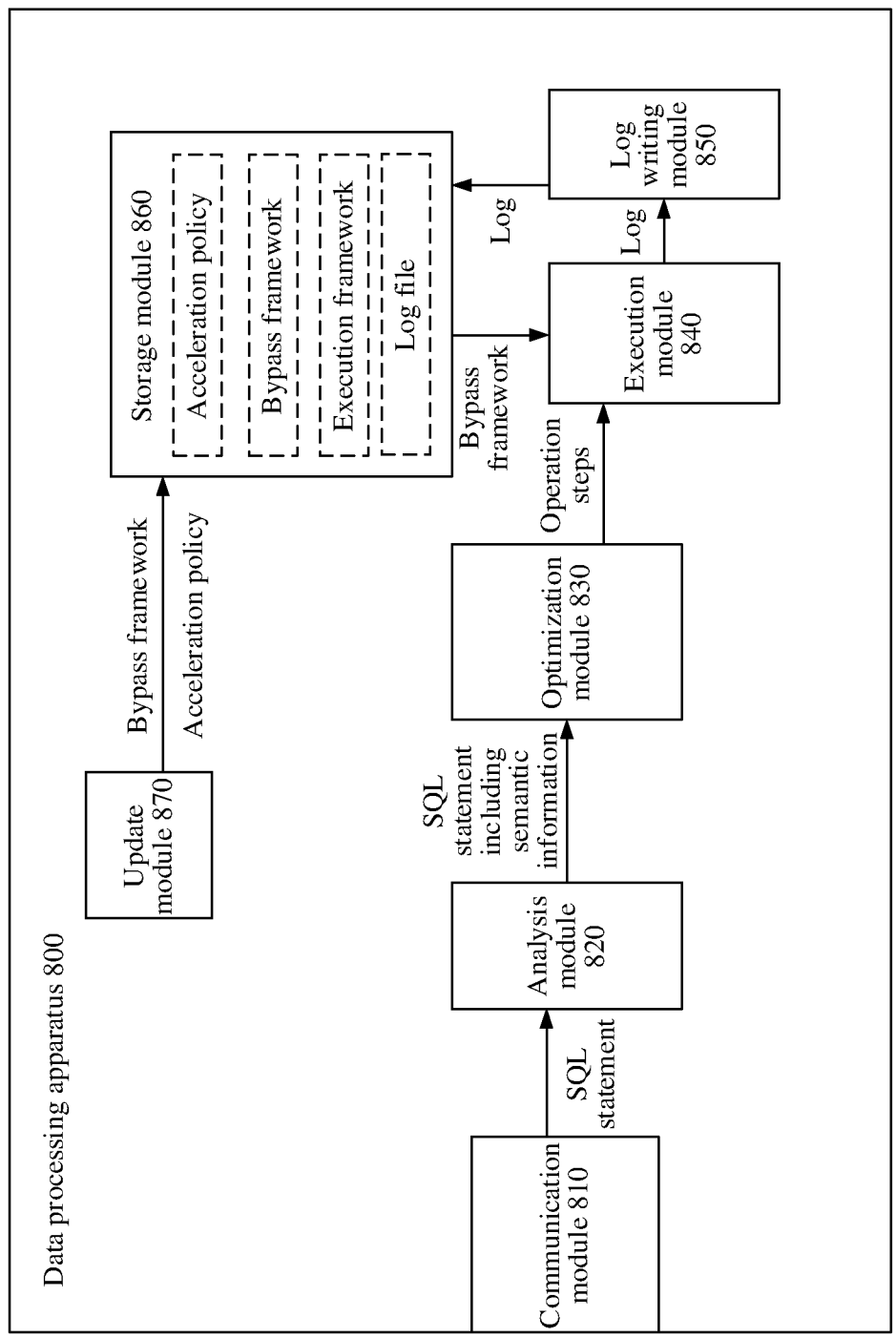
FIG. 8 is a schematic diagram of a structure of a data processing apparatus according to this application.

FIG. 8 is a schematic diagram of a structure of a possible data processing apparatus according to this embodiment. The data compression apparatus may be configured to implement functions of the computing device in the foregoing method embodiments. Therefore, the data compression apparatus can also implement beneficial effects of the foregoing method embodiments. In this embodiment, the data processing apparatus may be a module configured to implement the service layer 1211 shown in FIG. 1, or may be a module (for example, a chip) used in a server.

As shown in FIG. 8, the data processing apparatus 800 includes a communication module 81o, an analysis module 820, an optimization module 830, an execution module 840, a log writing module 850, and a storage module 860. The data processing apparatus 800 is configured to implement the functions of the computing device in the method embodiment shown in FIG. 2, FIG. 3, or FIG. 5.

The communication module 810 is configured to obtain a first operation command, where the first operation command is, for example, an SQL statement. The first operation command is used to perform data processing in a relational database. For example, the communication module 810 is configured to perform step 210 in FIG. 2.

The analysis module 820 is configured to perform lexical and syntactic parsing on the SQL statement to obtain an SQL statement including semantic information.

The optimization module 830 is configured to generate operation steps of the SQL statement based on the SQL statement including the semantic information.

The execution module 840 is configured to determine an acceleration policy of the first operation command, where the acceleration policy is used to accelerate a processing process of the first operation command; and perform an operation of the first operation command based on the acceleration policy.

The execution module 840 is specifically configured to determine the acceleration policy of the first operation command in at least one of the following manners: determining a processing mode based on an identifier of the first operation command, where the identifier indicates a processing mode usable by the first operation command, and the processing mode includes using a bypass framework to perform processing of the first operation command; or determining a target partition in a dynamic partition pruning manner in a data table associated with the first operation command. For example, the execution module 840 is configured to perform step 220 to step 270 in FIG. 2.

The storage module 860 is configured to store the acceleration policy, a bypass framework, an execution framework, a log file, and the like.

The data processing apparatus 800 further includes an update module 870.

The update module 870 is configured to update parameters such as the acceleration policy, the bypass framework, and the execution framework that are stored in the storage module 860.

It should be understood that the data processing apparatus 800 in this embodiment of this application may be implemented by using an ASIC or a programmable logic device (PLD). The foregoing PLD may be a complex programmable logic device (CPLD), a field programmable gate array (FPGA), a generic array logic (GAL), or any combination thereof. Alternatively, when the data processing method shown in FIG. 2, FIG. 3, or FIG. 5 may be implemented by using software, the data processing apparatus 800 and various modules of the data processing apparatus 800 may alternatively be software modules.

The data processing apparatus 800 according to this embodiment of this application may correspondingly perform the method described in embodiments of this application, and the foregoing and other operations and/or functions of units in the data processing apparatus 800 are respectively used to implement corresponding procedures of the method in FIG. 2, FIG. 3, or FIG. 5. For brevity, details are not described herein again.

Figure 9:
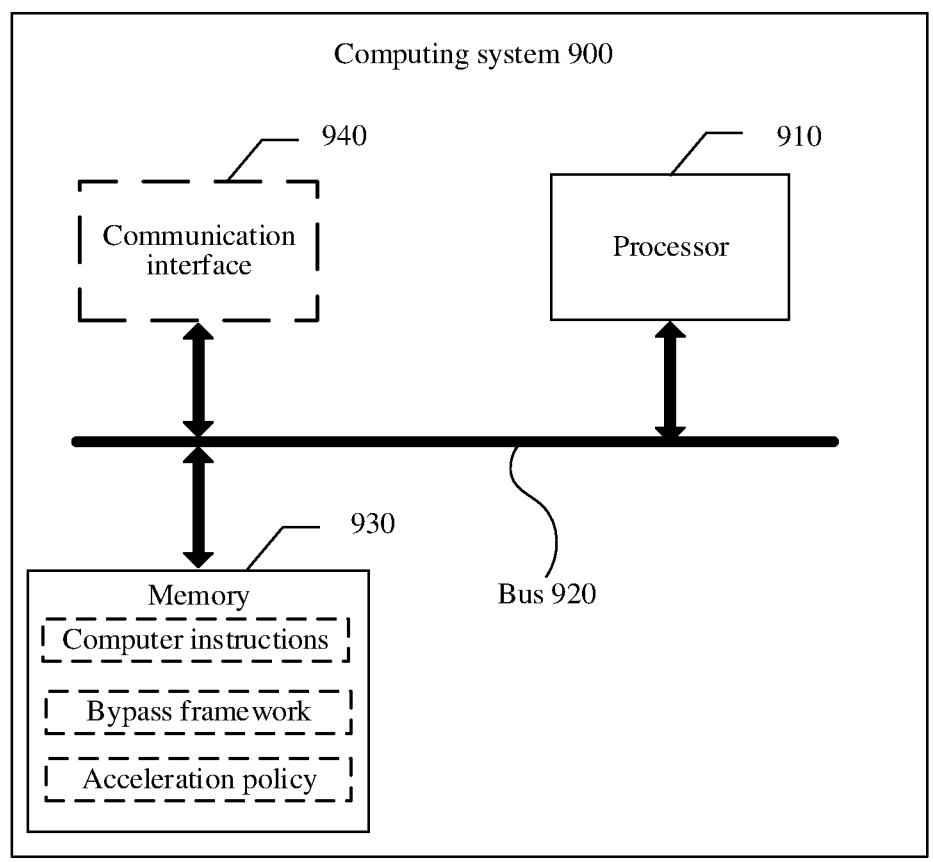
FIG. 9 is a schematic diagram of a structure of a computing system according to this application.

FIG. 9 is a schematic diagram of a structure of a computing system 900 according to an embodiment. As shown in the figure, the computing system 900 includes a processor 910, a bus 920, a memory 930, and a communication interface 940.

It should be understood that, in this embodiment, the processor 910 may be a CPU, or the processor 910 may be another general-purpose processor, a DSP, an ASIC, an FPGA or another programmable logic device, a discrete gate or a transistor logic device, a discrete hardware component, or the like. The general-purpose processor may be a microprocessor or any conventional processor.

Alternatively, the processor may be a GPU, an NPU, a microprocessor, an ASIC, or one or more integrated circuits configured to control program execution in the solutions of this application.

The communication interface 940 is configured to implement communication between the computing system 900 and an external device or component. In this embodiment, the communication interface 940 is configured to obtain an operation command for a relational database.

The bus 920 may include a path, configured to transmit information between the foregoing components (for example, the processor 910 and the memory 930). In addition to a data bus, the bus 920 may further include a power bus, a control bus, a state signal bus, and the like. However, for clear description, various buses in the figure are all marked as the bus 920.

In an example, the computing system 900 may include a plurality of processors. The processor may be a multi-core (multi-CPU) processor. The processor herein may be one or more devices, circuits, and/or computing units configured to process data (for example, computer program instructions). The processor 910 may invoke a bypass framework stored in the memory 930 to perform a combination operation on operation steps in an operation step set of a first operation command, to obtain a combined operation step set, and complete the first operation command based on the combined operation step set.

It should be noted that, in FIG. 9, an example in which the computing system 900 includes only one processor 910 and one memory 930 is used. In addition, the processor 910 and the memory 930 herein separately indicate a type of component or device. In a specific embodiment, a quantity of components or devices of each type may be determined based on a service requirement.

The memory 930 may correspond to a storage medium that is configured to store information such as an acceleration policy, a bypass framework, an execution framework, and a log file in the foregoing method embodiments, for example, a disk such as a mechanical hard disk or a solid-state drive.

The computing system 900 may be a general-purpose device or a dedicated device. For example, the computing system 900 may alternatively be a server or another device having a computing capability.

In a possible embodiment, the computing system 900 may alternatively be a cluster including a plurality of computing devices. The cluster includes a plurality of computing devices, and the plurality of computing devices may be connected through a network. A structure of each computing device is shown in FIG. 9. For brevity, details are not described herein again.

It should be understood that the computing system 900 according to this embodiment may correspond to the data processing apparatus 800 in the foregoing embodiment, and may correspond to a corresponding body for performing the method according to any one of FIG. 2, FIG. 3, or FIG. 5. In addition, the foregoing and other operations and/or functions of the modules in the data processing apparatus 800 are respectively used to implement corresponding procedures of the method in FIG. 2, FIG. 3, or FIG. 5. For brevity, details are not described herein again.

The method steps in the foregoing embodiments may be implemented by hardware, or may be implemented by a processor executing software instructions. The software instructions may include a corresponding software module. The software module may be stored in a random access memory (RAM), a flash memory, a read-only memory (ROM), a programmable read-only memory (programmable ROM, PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to the processor, so that the processor can read information from the storage medium and write information into the storage medium. Certainly, the storage medium may be a component of the processor. The processor and the storage medium may be located in an ASIC. In addition, the ASIC may be located in a network device or a terminal device. Certainly, the processor and the storage medium may alternatively exist as discrete components in the network device or the terminal device.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or instructions are loaded and run on a computer, all or some of the procedures or functions according to embodiments of this application are performed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium that can be accessed by a computer, or a data storage device, such as a server or a data center, integrating one or more usable media. The usable medium may be a magnetic medium, for example, a floppy disk, a hard disk, or a magnetic tape; or may be an optical medium, for example, a digital video disc (DVD); or may be a semiconductor medium, for example, a solid-state drive (SSD).

The foregoing descriptions are merely specific implementations of this application, but are not intended to limit the protection scope of this application. Any equivalent modification or replacement readily conceived by a person skilled in the art within the technical scope disclosed in this application shall fall within the protection scope of this application. Therefore, the protection scope of this application shall be subject to the protection scope of the claims.

What is claimed is:

1. A data processing method, comprising:
obtaining a first operation command, wherein the first operation command is used to perform data processing in a relational database;
determining an acceleration policy of the first operation command, wherein the acceleration policy is used to accelerate a processing process of the first operation command, and determining the acceleration policy of the first operation command comprises:
determining a processing mode based on an identifier of the first operation command, wherein the identifier indicates a processing mode usable by the first operation command, and the processing mode comprises using a bypass framework to perform processing of the first operation command; and
performing an operation of the first operation command based on the acceleration policy.

2. The method according to claim 1, wherein determining the processing mode based on the identifier of the first operation command comprises:
determining an operation step set based on the first operation command, wherein the operation step set comprises operation steps for executing the first operation command; and
performing a combination operation on the operation steps in the operation step set based on a type of the first operation command to obtain a combined operation step set; and
performing the operation of the first operation command based on the acceleration policy comprises completing the first operation command based on the combined operation step set.

3. The method according to claim 1, further comprising the determining a target partition in a dynamic partition pruning manner in a data table associated with the first operation command by:
determining the target partition from the data table based on an attribute of the target partition indicated by the operation of the first operation command, wherein the target partition comprises data of at least one attribute in the data table, wherein performing the operation of the first operation command based on the acceleration policy comprises performing the operation of the first operation command on the target partition.

4. The method according to claim 1, further comprising:
storing operation logs in a first operation log group in a memory in parallel based on a first rule, wherein the first operation log group comprises at least two operation logs, the at least two operation logs comprise a first operation log, and the first rule is used to determine whether an operation log in the first operation log group meets a condition for storing the operation log in the memory.

5. The method according to claim 4, wherein the first rule comprises:
a write permission of a redo log buffer that is in the memory and that is used to store a log is obtained; or
a state of at least one operation log comprised in the first operation log group is a write-allowed state.

6. The method according to claim 4, further comprising, before storing the operation logs in the first operation log group in the memory in parallel based on the first rule:
dividing the first operation log group based on a quantity of to-be-written operation logs.

7. The method according to claim 6, wherein:
the relational database is openGauss; and
the operation log comprises at least one of a redo log and a write-ahead log.

8. A data processing apparatus, comprising:
at least one processor; and
at least one memory with program code stored thereon, wherein the program code, when executed by the at least one processor, enables the data processing apparatus to:
obtain a first operation command, wherein the first operation command is used to perform data processing in a relational database,
determine an acceleration policy of the first operation command, wherein the acceleration policy is used to accelerate a processing process of the first operation command and the acceleration policy of the first operation command is determined by:
determining a processing mode based on an identifier of the first operation command, wherein the identifier indicates a processing mode usable by the first operation command, and the processing mode comprises using a bypass framework to perform processing of the first operation command, and
perform an operation of the first operation command based on the acceleration policy.

9. The apparatus according to claim 8, wherein the program code, when executed by the at least one processor, enables the data processing apparatus to determine the processing mode based on the identifier of the first operation command by:
determining an operation step set based on the first operation command, wherein the operation step set comprises operation steps for executing the first operation command;
performing a combination operation on the operation steps in the operation step set based on a type of the first operation command, to obtain a combined operation step set; and
completing the first operation command based on the combined operation step set.

10. The apparatus according to claim 8, wherein the program code, when executed by the at least one processor, enables the data processing apparatus to determine a target partition in a dynamic partition pruning manner based on a data table associated with the first operation command by:

determining the target partition from the data table based on an attribute of the target partition indicated by the operation of the first operation command, wherein the target partition comprises data of at least one attribute in the data table; and performing the operation of the first operation command on the target partition.

11. The apparatus according to claim 8, wherein the program code, when executed by the at least one processor, further enables the data processing apparatus to:

store operation logs in a first operation log group in a memory in parallel based on a first rule, wherein the first operation log group comprises at least two operation logs, the at least two operation logs comprise a first operation log, and the first rule is used to determine whether an operation log in the first operation log group meets a condition for storing the operation log in the memory.

12. The apparatus according to claim 11, wherein the first rule comprises:

a write permission of a redo log buffer that is in the memory and that is used to store a log is obtained; or a state of at least one operation log comprised in the first operation log group is a write-allowed state.

13. The apparatus according to claim 11, wherein the program code, when executed by the at least one processor, further enables the data processing apparatus to divide the first operation log group based on a quantity of to-be-written operation logs.

14. The apparatus according to claim 13, wherein the relational database is openGauss, and the operation log comprises at least one of a redo log and a write-ahead log.

15. A non-transitory computer readable medium with program code stored thereon, wherein the program code, when executed by at least one processor, enables the at least one processor to perform the steps of:

obtaining a first operation command, wherein the first operation command is used to perform data processing in a relational database;

determining an acceleration policy of the first operation command, wherein the acceleration policy is used to accelerate a processing process of the first operation command, and determining the acceleration policy of the first operation command comprises:

determining a processing mode based on an identifier of the first operation command, wherein the identifier indicates a processing mode usable by the first operation command, and the processing mode comprises using a bypass framework to perform processing of the first operation command; and performing an operation of the first operation command based on the acceleration policy.

16. The non-transitory computer readable medium according to claim 15, wherein determining the processing mode based on the identifier of the first operation command comprises:

determining an operation step set based on the first operation command, wherein the operation step set comprises operation steps for executing the first operation command; and performing a combination operation on the operation steps in the operation step set based on a type of the first operation command, to obtain a combined operation step set, wherein performing the operation of the first operation command based on the acceleration policy comprises completing the first operation command based on the combined operation step set.

17. The non-transitory computer readable medium according to claim 15, wherein the program code, when executed by the at least one processor, enables the at least one processor to determine a target partition in a dynamic partition pruning manner based on a data table associated with the first operation command by:

determining the target partition from the data table based on an attribute of the target partition indicated by the operation of the first operation command, wherein the target partition comprises data of at least one attribute in the data table; and performing the operation of the first operation command on the target partition.

18. The non-transitory computer readable medium according to claim 15, wherein the program code, when executed by the at least one processor, further enables the at least one processor to:

store operation logs in a first operation log group in a memory in parallel based on a first rule, wherein the first operation log group comprises at least two operation logs, the at least two operation logs comprise a first operation log, and the first rule is used to determine whether an operation log in the first operation log group meets a condition for storing the operation log in the memory.

19. The non-transitory computer readable medium according to claim 18, wherein the first rule comprises:

a write permission of a redo log buffer that is in the memory and that is used to store a log is obtained; or a state of at least one operation log comprised in the first operation log group is a write-allowed state.

20. The non-transitory computer readable medium according to claim 18, wherein the program code, when executed by the at least one processor, further enables the at least one processor to divide the first operation log group based on a quantity of to-be-written operation logs.

21. The non-transitory computer readable medium according to claim 20, wherein the relational database is openGauss, and the operation log comprises at least one of a redo log and a write-ahead log.

* * * * *